United States Patent
Yamamura et al.

(10) Patent No.: US 7,628,721 B2
(45) Date of Patent: Dec. 8, 2009

(54) DEVICE OPERABLE TO DISTRIBUTE DRIVING FORCES

(75) Inventors: Takuya Yamamura, Okazaki (JP); Yuichi Ushiroda, Okazaki (JP); Kaoru Sawase, Anjo (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 125 days.

(21) Appl. No.: 12/051,667

(22) Filed: Mar. 19, 2008

(65) Prior Publication Data

US 2008/0296081 A1 Dec. 4, 2008

(30) Foreign Application Priority Data

May 31, 2007 (JP) .............................. P2007-145305

(51) Int. Cl.
    *B62D 11/06* (2006.01)
(52) U.S. Cl. ...................................................... 475/19
(58) Field of Classification Search ................. None
    See application file for complete search history.

(56) References Cited

U.S. PATENT DOCUMENTS

| 7,463,964 | B2* | 12/2008 | Ushiroda et al. | .............. 701/80 |
| 7,520,833 | B2* | 4/2009 | Honda et al. | ................ 475/248 |
| 2005/0266953 | A1 | 12/2005 | Puiu | |
| 2007/0021262 | A1 | 1/2007 | Honda et al. | |
| 2009/0018741 | A1* | 1/2009 | Miura et al. | ................... 701/72 |
| 2009/0018742 | A1* | 1/2009 | Miura et al. | ................... 701/72 |
| 2009/0062998 | A1* | 3/2009 | Ushiroda et al. | ............. 701/69 |

FOREIGN PATENT DOCUMENTS

| EP | 0575151 A1 | 12/1993 |
| EP | 0841206 A2 | 5/1998 |
| EP | 1616743 A2 | 1/2006 |
| JP | H01-166157 U | 11/1989 |
| JP | 2738225 B2 | 1/1998 |
| JP | 10-157483 A | 6/1998 |
| JP | 2005-083550 A | 3/2005 |
| JP | 2007-030671 A | 2/2007 |

* cited by examiner

*Primary Examiner*—Dirk Wright
(74) *Attorney, Agent, or Firm*—Birch, Stewart, Kolasch & Birch, LLP

(57) ABSTRACT

A device operable to distribute driving forces to left and right wheels of a vehicle, includes: a differential mechanism, a driving-force adjuster and a differential limiter. The differential mechanism is operable to distribute a driving force from a drive source of the vehicle to the left and right wheels as distributed driving forces, while allowing a rotation difference between the left and right wheels. The driving-force adjuster is operable to adjust each of the distributed driving forces. The differential limiter is operable to limit rotation difference between the left and right wheels by applying a limiting torque to the differential mechanism.

6 Claims, 9 Drawing Sheets

DEVICE OPERABLE TO DISTRIBUTE DRIVING FORCES

BACKGROUND

1. Field of the Invention

The present invention relates to a driving-force laterally-distributing device and, more particularly, to a technique for distributing a driving force from a driving force source such as an engine properly to left and right wheels in accordance with the running state of a vehicle.

2. Description of the Related Art

In recent years, there has been developed a device for controlling a yawing moment to act on a vehicle, by generating a driving force difference between left and right wheels at a turning time of a vehicle, thereby to improve the turning performance of the vehicle.

For example, Japanese Patent No. 2,738,225 discloses a driving-force laterally-distributing device provided with a driving force transmission control mechanism for distributing the driving forces of the left and right wheels by transmitting the driving force of an engine from an input unit, while allowing the rotation difference between the left and right wheels, through a differential mechanism to transmit the driving force to the axles of the left and right wheels and by shifting the driving force of one of the axles of the left and right wheels to the driving force of the other.

According to the technique disclosed in Japanese Patent No. 2,738,225, however, the driving force difference is established between the left and right wheels by shifting the driving force to either the left or right wheel, but cannot be limited.

Therefore, there arise a problem that the slip of the left and right drive wheels at the straight running time of the vehicle cannot be suppressed.

If the slip of the left and right drive wheels at the straight running time of the vehicle is suppressed by the technique of Japanese Patent No. 2,738,225, for example, the driving force shifts to either the left or right wheel, thereby to cause a problem that the vehicle turns.

SUMMARY

According to one aspect of the invention, there is provided a device operable to distribute driving forces to left and right wheels of a vehicle, the device including: a differential mechanism, operable to distribute a driving force from a drive source of the vehicle to the left and right wheels as distributed driving forces, while allowing a rotation difference between the left and right wheels; a driving-force adjuster, operable to adjust each of the distributed driving forces; and a differential limiter, operable to limit rotation difference between the left and right wheels by applying a limiting torque to the differential mechanism.

BRIEF DESCRIPTION OF THE DRAWINGS

Embodiment may be described in detail with reference to the accompanying drawings, in which.

DETAILED DESCRIPTION OF THE INVENTION

Exemplary embodiments of the present invention are described in the following with reference to the accompanying drawings.

Figure 1:
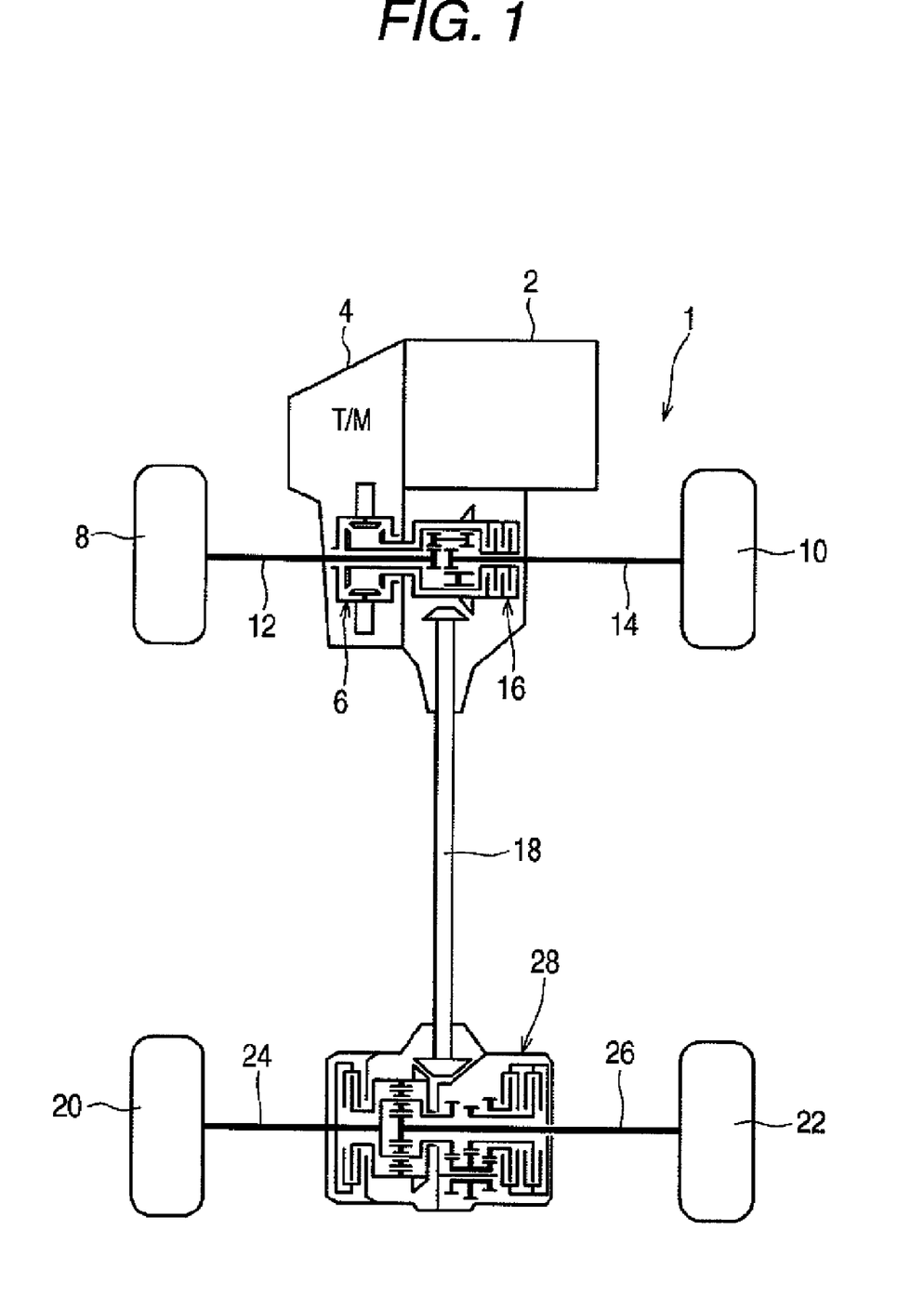
FIG. 1 is an entire constitution diagram of a vehicle having a driving-force lateral-distributing device according to the invention.
Figure 2:
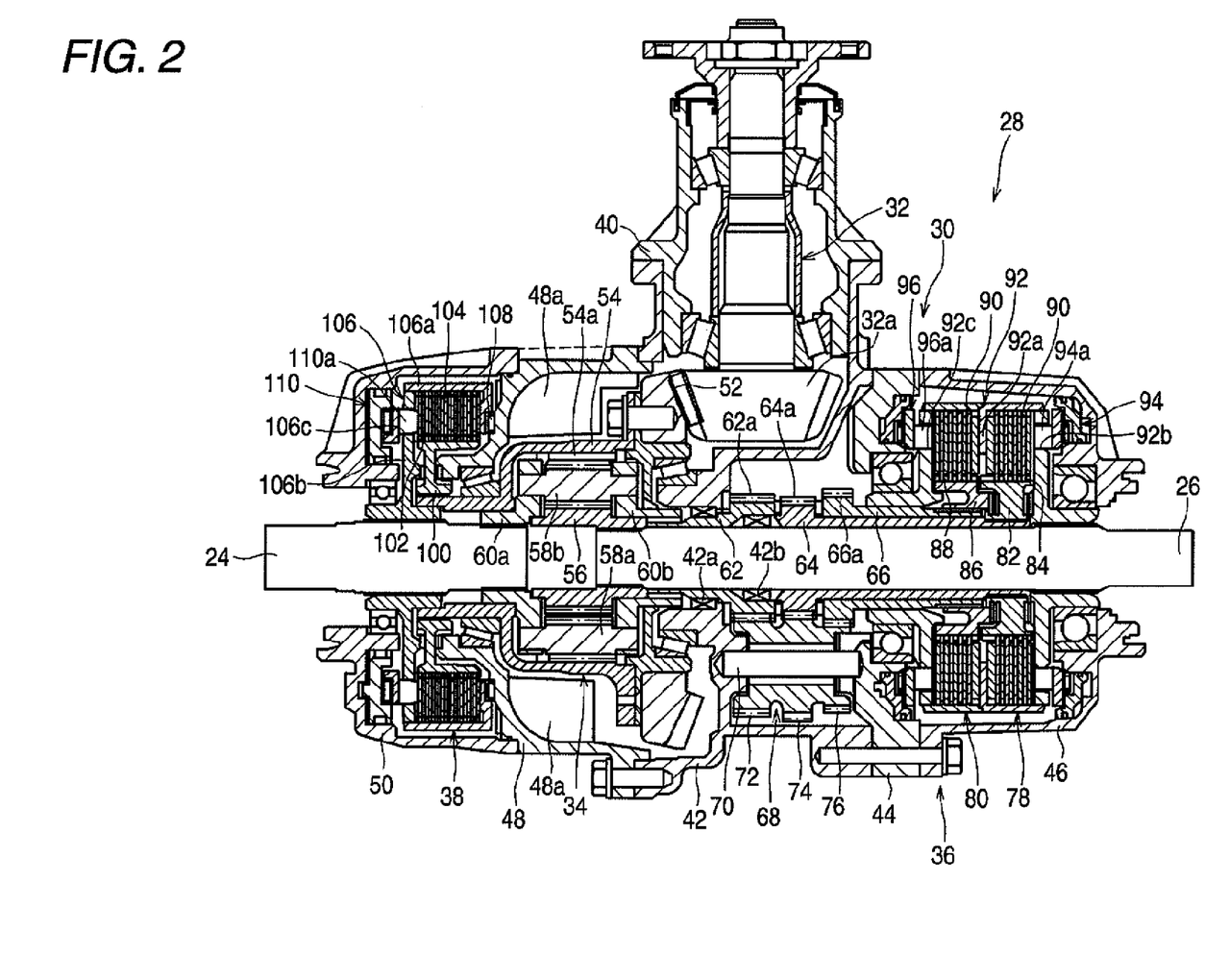
FIG. 2 is a sectional view of the driving-force laterally-distributing device according to the invention.
Figure 3:
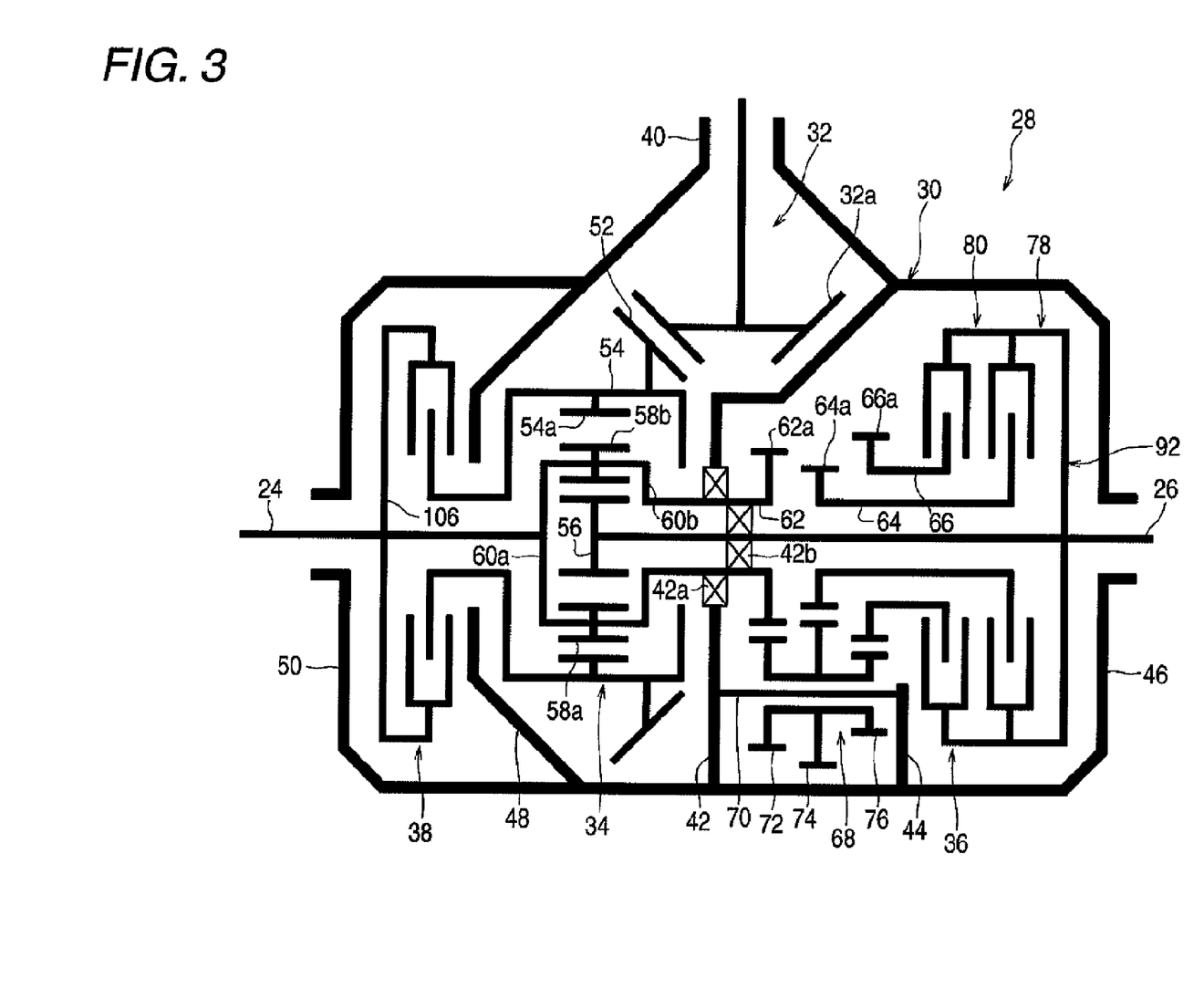
FIG. 3 is a constitution diagram schematically showing the driving-force laterally-distributing device according to the invention.
Figure 4:
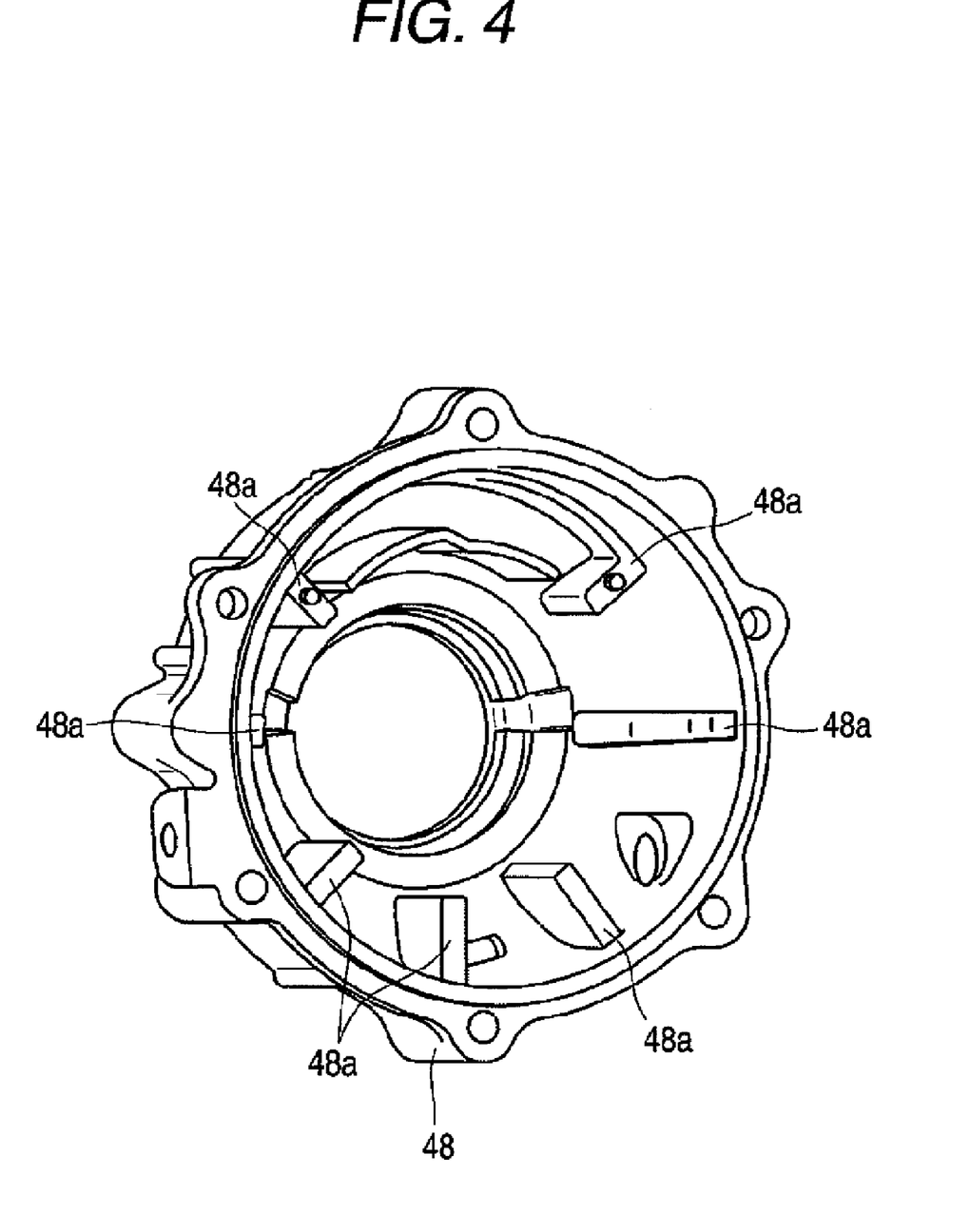
FIG. 4 is a perspective view of a left partition portion in the driving-force laterally-distributing device according to the invention.

Reference is made to FIG. 1 to FIG. 4, of which: FIG. 1 is an entire constitution diagram of a vehicle having a driving-force lateral-distributing device according to the invention; FIG. 2 is a sectional view of the driving-force laterally-distributing device according to the invention; FIG. 3 is a constitution diagram schematically showing the driving-force laterally-distributing device according to the invention; and FIG. 4 is a perspective view of a left partition portion.

As shown in FIG. 1, a vehicle 1 is a four-wheel drive vehicle constituted to comprise: an engine 2 mounted as a drive source on a body front portion; a transmission 4 connected to one side of the engine 2; a center diff 6 connected to the transmission 4 for distributing the driving force to a front-wheel side and a rear-wheel side; a front diff 16 for distributing the driving force distributed to the front-wheel side by the center diff 6, to the individual axles 12 and 14 of a left front wheel 8 and a right front wheel 10; a propeller shaft 18 for transmitting the driving force distributed to the rear-wheel side by the center diff 6, to the rear-wheel side; and a driving-force laterally-distributing device 28 connected to one end of the propeller shaft 18 for distributing the driving force to the individual axles 24 and 26 (the left- and right-wheel axles) of a left rear wheel 20 and a right rear wheel 22 in accordance with the running state of the vehicle 1.

The engine 2, the transmission 4, the center diff 6 and the front diff 16 thus far described are well known in the art, and the driving-force laterally-distributing device 28 according to the invention is described in detail in the following.

The driving-force laterally-distributing device 28 is constituted by housing, in a body case 30: an input unit 32 forming one end side of the propeller shaft 18; a differential mechanism unit 34 (a differential unit) connected to the input unit 32 and arranged on the left rear-wheel axle 24 and the right rear-wheel axle 26; a driving-force laterally-adjusting mechanism unit 36 (a driving-force laterally-adjusting unit) arranged on the right rear-wheel axle 26; and a differential limiting mechanism unit 38 (a differential limiting unit) arranged on the left rear-wheel axle 24.

The body case 30 is constituted to include: an input case unit 40 for housing the input unit 32; a central wall portion 42 connected to the input case unit 40 and partitioning the differential mechanism unit 34 and the driving-force laterally-adjusting mechanism unit 36; a right-side wall portion 46 for housing the driving-force laterally-adjusting mechanism unit 36 together with the central wall portion 42 while interposing a right partition portion 44; a left partition portion 48 for housing the differential mechanism unit 34 together with the central wall portion 42 and partitioning the differential mechanism unit 34 and the differential limiting mechanism unit 38; and a left-side wall portion 50 for housing the differential limiting mechanism unit 38 together with the left partition portion 48.

The right-side wall portion 46, the left partition portion 48 and the left-side wall portion 50 are generally formed into such cup shapes as are individually opened toward the central wall portion 42 and as have holes capable of passing the axles 24, 26 and so on of the left and right wheels 20 and 22 therethrough.

Moreover, the central wall portion 42 and the right partition portion 44 are also formed to have such holes in their central portions as can pass the axles 24, 26 and so on therethrough. In the individual holes of those individual wall portions 42, 44, 46, 48 and 50, moreover, the individual axle members such as the left rear-wheel axle 24 and the right rear-wheel axle 26 are rotatably born through bearings or the like.

Especially in the central wall portion 42, oil seal members 42a and 42b are arranged in the hole portions so that they partition the side of the differential mechanism unit 34 and the side of the driving-force laterally-adjusting mechanism unit 36 liquid-tight.

In the body case 30, moreover, oils of different kinds are reserved in such one area on the side of the differential mechanism unit 34 partitioned liquid-tight that the input unit 32, the differential mechanism unit 34 and the differential limiting mechanism unit 38 are housed, and in the other area on the side of the driving-force laterally-adjusting mechanism unit 36.

As shown in FIG. 4, moreover, the left partition portion 48 has a plurality of plate-shaped rib portions 48a formed radially on its inner circumference in the axial direction (as will be simply called the "axle direction") of the axles 24 and 26 of the left and right rear wheels 20 and 22 and in the radial directions, i.e., radially of the axles 24 and 26. Here, the rib portions 48a are so spaced at a predetermined distance from the differential mechanism unit 34 that they are positioned to have no direct interference with the differential mechanism unit 34.

The specific constitutions of the individual units housed in the body case 30 are described in the following.

The input unit 32 is equipped at its leading end with a drive gear 32a, which meshes with the crown gear 52 of the differential mechanism unit 34.

In the differential mechanism unit 34, a generally cylindrical diff case 54 is connected to the left-side face of the crown gear 52.

Moreover, the diff case 54 has the so-called double pinion type planetary gear mechanism. Specifically, a ring gear 54a is formed on the inner circumference of the diff case 54, and a sun gear 56 is splined to one end portion of the right rear-wheel axle 26. Between the ring gear 54a and the sun gear 56, there are arranged a pair of planetary pinions 58a and 58b, which mesh with the ring gear 54a on one side and with the sun gear 56 on the other side. Here in FIGS. 2 and 3, the planetary pinions 58a and 58b are individually shown by one, but totally three sets of paired planetary pinions 58a and 58b are arranged between the ring gear 54a and the sun gear 56.

Moreover, the left-end portions of the shafts of the individual planetary pinions 58a and 58b are borne in a left-side planetary carrier 60a splined to one end portion of the left rear-wheel axle 24. On the other hand, the right-end portions of the shafts of the individual planetary pinions 58a and 58b are borne on a right-side planetary carrier 60b, which is splined to the left-end portion of an input intermediate shaft 62 rotatably fitted on the right rear-wheel axle 26.

Specifically in the differential mechanism unit 34, the rotational driving force from the engine 2 is transmitted through the propeller shaft 18 from the input unit 32 to the crown gear 52 so that the diff case 54 rotates together with the crown gear 52. Moreover, the ring gear 54a on the inner circumference of the diff case 54 rotates so that the planetary pinions 58a and 58b revolve, while rotating on their axes, around the sun gear 56. As a result, the rotational driving forces are transmitted individually through the left-side planetary carrier 60a to the left rear-wheel axle 24, through the right-side planetary carrier 60b to the input intermediate shaft 62 of the driving-force laterally-adjusting mechanism unit 36, and through the sun gear 56 to the right rear-wheel axle 26.

In the driving-force laterally-adjusting mechanism unit 36, there are arranged: the input intermediate shaft 62 which is rotatably fitted on the outer circumference of the right rear-wheel axle 26 so that it rotates synchronously with the right-side planetary carrier 60b; an accelerating intermediate shaft 64 which is arranged on the right side of the input intermediate shaft 62 and rotatably fitted on the outer circumference of the right rear-wheel axle 26; and a decelerating intermediate shaft 66 which is rotatably fitted on the outer circumference of the accelerating intermediate shaft 64.

Moreover, at the right-end portion of the input intermediate shaft 62, the left-end portion of the accelerating intermediate shaft 64 and the left-end portion of the decelerating intermediate shaft 66, respectively, there are formed an input counter gear portion 62a, an accelerating counter gear portion 64a and a decelerating counter gear portion 66a. These individual counter gear portions 62a, 64a and 66a are arrayed in the axle direction, and their tooth numbers are set such that the accelerating counter gear portion 64a is less but the decelerating counter gear portion 66a is more than the input counter gear portion 62a.

Moreover, accelerating/decelerating gears 68 are arranged on the outer circumference sides of the aforementioned individual counter gear portions 62a, 64a and 66a. Here, only one accelerating/decelerating gear 68 is shown in FIGS. 2 and 3, but totally three sets of accelerating/decelerating gears 68 are arranged on the outer circumference sides of the individual counter gear portions 62a, 64a and 66a.

The accelerating/decelerating gear 68 has a center shaft 70 supported at the end portion of the body case 30 by the central wall portion 42 and the right partition portion 44. On the outer circumference of the center shaft 70, moreover, there are integrally and rotatably formed: an input gear portion 72 for meshing with the input counter gear portion 62a, an accelerating gear portion 74 for meshing with the accelerating counter gear portion 64a; and a decelerating gear portion 76 for meshing with the decelerating counter gear portion 66a. The tooth numbers of those individual gear portions 72, 74 and 76 are set such that the accelerating gear portion 74 is more but the decelerating gear portion 76 is less than the input gear portion 72.

In short, the rotational driving force, as transmitted to the input intermediate shaft 62, is transmitted from the input counter gear portion 62a through the input gear portion 72 to the accelerating/decelerating gear 68. Moreover, the rotating speed, as transmitted from the accelerating gear portion 74 of the accelerating/decelerating gear 68 through the accelerating counter gear portion 64a, of the accelerating intermediate shaft 64 is accelerated, by the aforementioned tooth number relation, i.e., by the relation of the gear ratio, to a rotating speed higher than that of the input intermediate shaft 62. On the other hand, the rotating speed, as transmitted from the decelerating gear portion 76 through the decelerating counter gear portion 66a, of the decelerating intermediate shaft 66 is decelerated to a rotating speed lower than that of the input intermediate shaft 62.

Moreover, an accelerating clutch portion 78 and a decelerating clutch portion 80 of multi-disc type friction clutches are formed at the right-side end portions of the accelerating intermediate shaft 64 and the decelerating intermediate shaft 66.

Specifically, an accelerating-side disc supporting member 82 is splined to the right-side end portion of the accelerating intermediate shaft 64, and a plurality of accelerating-side inner discs 84 are splined, while keeping a predetermined spacing inbetween, to the outer circumference of the accelerating-side disc supporting member 82. On the other hand, a decelerating-side disc supporting member 86 is so splined to the right-side end portion of the decelerating intermediate shaft 66 as is located on the left side of the accelerating-side disc supporting member 82, and a plurality of decelerating-side inner discs 88 are splined, while keeping a predetermined spacing inbetween, to the outer circumference of the decelerating-side disc supporting member 86.

Moreover, outer discs 90 are individually arranged between the individual accelerating-side inner discs 84 and between the individual decelerating-side inner discs 88.

Moreover, a cylindrical clutch housing 92 is disposed to cover the individual discs 84, 88 and 90 and the individual disc supporting members 82 and 86, and the outer circumferences of the outer discs 90 are splined to the inner circumference of the clutch housing 92.

In the clutch housing 92, there is formed a partition plate 92a which partitions the individual discs 84 and 90 on the accelerating side and the individual discs 88 and 90 on the decelerating side. In the two left- and right-side faces of the clutch housing 92, moreover, there are formed a plurality of through holes 92b and 92c, which are juxtaposed in the circumferential direction. Pistons 94a and 96a are so inserted into the through holes 92b and 92c as can slide in the axial directions.

The pistons 94a and 96a are the portions of hydraulic piston mechanisms 94 and 96, which are positioned on the two left and right sides of the clutch housing 92 and which are disposed in the right-side wall portion 46 and the right partition portion 44 of the body case 30, respectively. The hydraulic piston mechanisms 94 and 96 form part of an electronically controlled oil pressure generating device, which is operationally controlled by the not-shown ECU mounted on the vehicle 1.

Moreover, the clutch housing 92 is splined at its right-side end portion to the right rear-wheel axle 26.

In short, the accelerating clutch portion 78 is constituted to include the clutch housing 92, the hydraulic piston mechanism 94 disposed in the right-side wall portion 46, the accelerating-side disc supporting member 82, and the inner disc 84 and the outer disc 90 on the accelerating side. The decelerating clutch portion 80 is constituted to include the clutch housing 92, the hydraulic piston mechanism 96 disposed in the right partition portion 44, the decelerating-side disc supporting member 86, and the inner disc 88 and the outer disc 90 on the decelerating side.

When the individual discs 84 and 90 on the accelerating side are pushed by the piston 94a on the accelerating side, for example, the driving force is transmitted between the accelerating intermediate shaft 64 and the right rear-wheel axle 26. When the individual discs 88 and 90 on the decelerating side are pushed by the piston 96a on the decelerating side, the driving force is transmitted between the decelerating intermediate shaft 66 and the right rear-wheel axle 26. Here, the individual disks 84, 88 and 90, as disposed in the accelerating clutch portion 78 and the decelerating clutch portion 80, are basically used in a slip state, i.e., in a half-clutch state.

On the other hand, the differential limiting mechanism unit 38 is the so-called differential limiting clutch made of a multi-disc friction clutch.

Specifically, a differential limiting clutch disc supporting member 100 is splined to the left-side end portion of the diff case 54 of the differential limiting mechanism unit 34, and a plurality of differential limiting clutch inner discs 102 are splined, while keeping a predetermined spacing inbetween, to the outer circumference of the differential limiting clutch disc supporting member 100.

Moreover, a differential limiting clutch outer disc 104 is arranged between the individual differential limiting clutch inner discs 102.

Moreover, a cylindrical differential limiting clutch housing 106 is disposed to cover those individual discs 102 and 104, and the differential limiting clutch outer disc 104 is splined to the inner circumference of the differential limiting clutch housing 106.

The differential limiting clutch housing 106 abuts rotatably at its right-side face against the left partition portion 48 of the body case 30 through a thrust bearing 108.

Moreover, the differential limiting clutch housing 106 is constituted to include two parts, i.e., a clutch case 106a and a clutch flange 106b, which are splined to each other. Therefore, the frictional clutch disc can be assembled in the differential limiting clutch housing 106.

In the left-side face of the differential limiting clutch housing 106, on the other hand, a plurality of through holes 106c are so formed as are arrayed in the circumferential direction. Pistons 110a are so individually fitted in the through holes 106c as can slide in the axial directions.

The pistons 110a form part of a differential limiting clutch hydraulic piston mechanism 110, which is positioned on the left side of the differential limiting clutch housing 106 and disposed in the left-side wall portion 50 of the body case 30. The differential limiting clutch hydraulic piston mechanism 110 also forms part of the electronic control oil pressure generating device, which is operationally controlled like the hydraulic piston mechanism 94 and 96 of the accelerating clutch portion 78 and the decelerating clutch portion 80 by the ECU of the vehicle 1.

Moreover, the left-side end portion of the differential limiting clutch housing 106 is splined to the left rear-wheel axle 24.

Thus, the differential limiting mechanism unit 38 is constituted to include the differential limiting clutch disc supporting member 100, the differential limiting clutch housing 106, the differential limiting clutch hydraulic piston mechanism 110, the differential limiting clutch inner disk 102 and the differential limiting clutch outer disk 104.

Moreover, the individual discs 102 and 104 are pushed and engaged by the pistons 110a, for example, so that the rotations transmitted from the diff case 54 are transmitted, as they are, through the differential limiting clutch housing 106 to the left rear-wheel axle 24. Here, the differential limiting clutch inner disc 102 and the differential limiting clutch outer disc 104 are made of such steel discs as can be brought into complete engagement (or can be directly coupled).

The operations of the driving-force laterally-distributing device thus constituted are described in the following.

In this driving-force laterally-distributing device 28, the rotational driving force from the engine 2 is transmitted from the drive gear 32*a* of the input unit 32 to the crown gear 52 of the differential mechanism unit 34.

In this differential mechanism unit 34, moreover, when the diff case 54 rotates, and the planetary pinions 58*a* and 58*b* rotate and revolve through the ring gear 54*a* so that the rotational driving force is transmitted through the left-side planetary carrier 60*a* to the left rear-wheel axle 24 and through the sun gear 56 to the right rear-wheel axle 26.

By these actions of the differential mechanism unit 34, the rotating speed difference between the axles 24 and 26 is allowed by the behaviors of the planetary pinions 58*a* and 58*b*, so that the rotational driving force inputted is equivalently transmitted to the axles 24 and 26 of the left and right wheels 20 and 22.

On the other hand, the rotations of the right-side planetary carrier 60*b* are transmitted through the input intermediate shaft 62 to the driving-force laterally-adjusting mechanism unit 36.

In the driving-force laterally-adjusting mechanism unit 36, the rotating speed inputted from the input intermediate shaft 62 is so transmitted through the accelerating/decelerating gears 68 that it is accelerated for the accelerating intermediate shaft 64 and decelerated for the decelerating intermediate shaft 66.

On the other hand, the right rear-wheel axle 26 rotates through the sun gear 56 of the differential mechanism unit 34 so that the clutch housing 92 of the driving-force laterally-adjusting mechanism unit 36 also rotates.

In accordance with the control of the ECU, moreover, the pistons 94*a* and 96*a* of the hydraulic piston mechanisms 94 and 96 on either the accelerating side or the decelerating side push the corresponding individual disks 84, 88 and 90 so that the driving force is transmitted at the accelerating clutch portion 78 or the decelerating clutch portion 80 between the accelerating intermediate shaft 64 or the decelerating intermediate shaft 66 and the right rear-wheel axle 26.

Specifically in the accelerating clutch portion 78, the rotating speed of the accelerating inner disc 84 on the side of the accelerating intermediate shaft 64 is higher than the rotating speed of the outer disc 90 on the side of the right rear-wheel axle 26. If the individual discs 84 and 90 are made in this state to engage with each other, therefore, the rotational driving force on the side of the accelerating intermediate shaft 64 shifts to the side of the right rear-wheel axle 26 in accordance with the principle that the driving force is transmitted from the higher side to the lower side of the rotating speed. As a result, the driving force of the right rear-wheel axle 26 increases, but the rotational driving force of the left rear-wheel axle 24, as transmitted from the accelerating intermediate shaft 64 through the accelerating/decelerating gear 68, the input intermediate shaft 62 and the differential mechanism unit 34, decreases.

In case the decelerating clutch unit 80 is engaged, on the contrary, the rotational driving force of the right rear-wheel axle 26 decreases, but the rotational driving force of the left rear-wheel axle 24 increases.

When the accelerating clutch portion 78 and the decelerating clutch portion 80 are individually out of engagement, the rotational driving force is transmitted to the axles 24 and 26 of the left and right wheels 20 and 22 exclusively by the operations of the differential mechanism unit 34.

On the other hand, the rotational driving force of the diff case 54 of the differential mechanism unit 34 is transmitted through the differential limiting clutch disc supporting member 100 of the differential limiting mechanism unit 38 to the differential limiting clutch inner disc 102.

In accordance with the control of the ECU, moreover, the pistons 110*a* of the differential limiting clutch hydraulic piston mechanism 110 push and engage the friction clutches 102 and 104 of the individual differential limiting clutches. The engagement limits the differential, as has been allowed in the differential mechanism unit 34, between the diff case 54 and the left rear-wheel axle 24.

In short, the rotational driving force from the input unit 32 is transmitted directly to the left rear-wheel axle 24.

Moreover, the differential mechanism unit 34 limits the differential of the diff case 54 from the left-side planetary carrier 60*a* connected to the left rear-wheel axle 24, that is, the planetary gears 58*a* and 58*b* and the sun gear 56. As a result, the limitation is also made on the differential of the right rear-wheel axle 26 through the sun gear 56, that is, on the differential of the axles 24 and 26 of the left and right rear wheels 20 and 22.

On the basis of the operations thus far described, the ECU controls not only the accelerating clutch portion 78 and the decelerating clutch portion 80 of the driving-force laterally-adjusting mechanism unit 36 but also the differential limiting clutches of the differential limiting unit 38 in accordance with the running state of the vehicle 1, thereby to distribute the proper driving force to the left and right rear wheels 20 and 22.

At a turning time of the vehicle 1, for example, the driving force difference suitable for the turn can be established in the left and right rear wheels 20 and 22 by the aforementioned driving-force laterally-adjusting mechanism, thereby to improve the turning performance and the traction performance.

At the straight running time of the vehicle 1, on the other hand, the slips of the left and right rear wheels 20 and 22 can be suppressed by the aforementioned differential limiting mechanism, thereby to improve the traction performance.

Thus, the running stability not only at the turning time but also at the straight running time can be improved to perform the driving force distribution more properly according to the running state.

In the driving-force laterally-distributing device 28, moreover, the individual units 32, 34, 36 and 38 are housed in the body case 30, and the oil is shared among the input unit 32, the differential mechanism unit 34 and the differential limiting mechanism unit 38. As a result, the driving-force laterally-distributing device 28 can be made to have the compact and simple constitution, thereby to suppress the complexity of the structure and the layout and the rise in the cost.

Moreover, the differential limiting mechanism unit 38 is arranged on the left side of the differential mechanism unit 34, that is, on the side opposite to the driving-force laterally-adjusting mechanism unit 36, so that its space can be sufficiently retained.

Moreover, the rib portions 48*a* are formed at the left partition portion 48 defining the differential mechanism unit 34 and the differential limiting unit 38, so that they can support the differential limiting mechanism unit 38 and the body case 30 themselves sufficiently. Moreover, the rib portions 48*a* are formed radially of the axle direction so that they can suppress the agitation of the oil, as might otherwise be caused by the rotations of the diff case 54 of the differential mechanism unit 34. At the same time, the excessive temperature rise of the oil or the body case 30 can be suppressed by the heat dissipation through the rib portions 48*a*, thereby to keep the actions of the differential mechanism unit 34, the differential limiting mechanism unit 38 and so on satisfactory.

On the other hand, the right-side face of the differential limiting clutch housing 106 of the differential limiting mechanism unit 38 abuts against the left partition portion 48 having those rib portions 48a through the thrust bearing 108. When the individual disks 102 and 104 are pushed by the pistons 110a of the differential limiting mechanism unit 38, the pushing force can be dispersed to the left partition portion 48, so that the elastic deformation of the differential limiting mechanism unit 38 can be suppressed to improve the responsiveness of the differential limitation and the durability satisfactorily.

Thus, the driving-force laterally-distributing device according to the invention is enabled, by the simple constitution, to perform the driving force distribution more properly according to the running state.

The description on the mode of embodiment of the driving-force laterally-distributing device according to the invention is thus far finished. However, the mode of embodiment should not be limited to the aforementioned one.

For example, the aforementioned mode of embodiment may also be modified into driving-force laterally-distributing devices having constitutions, as shown in FIG. 5 to FIG. 9.

Figure 5:
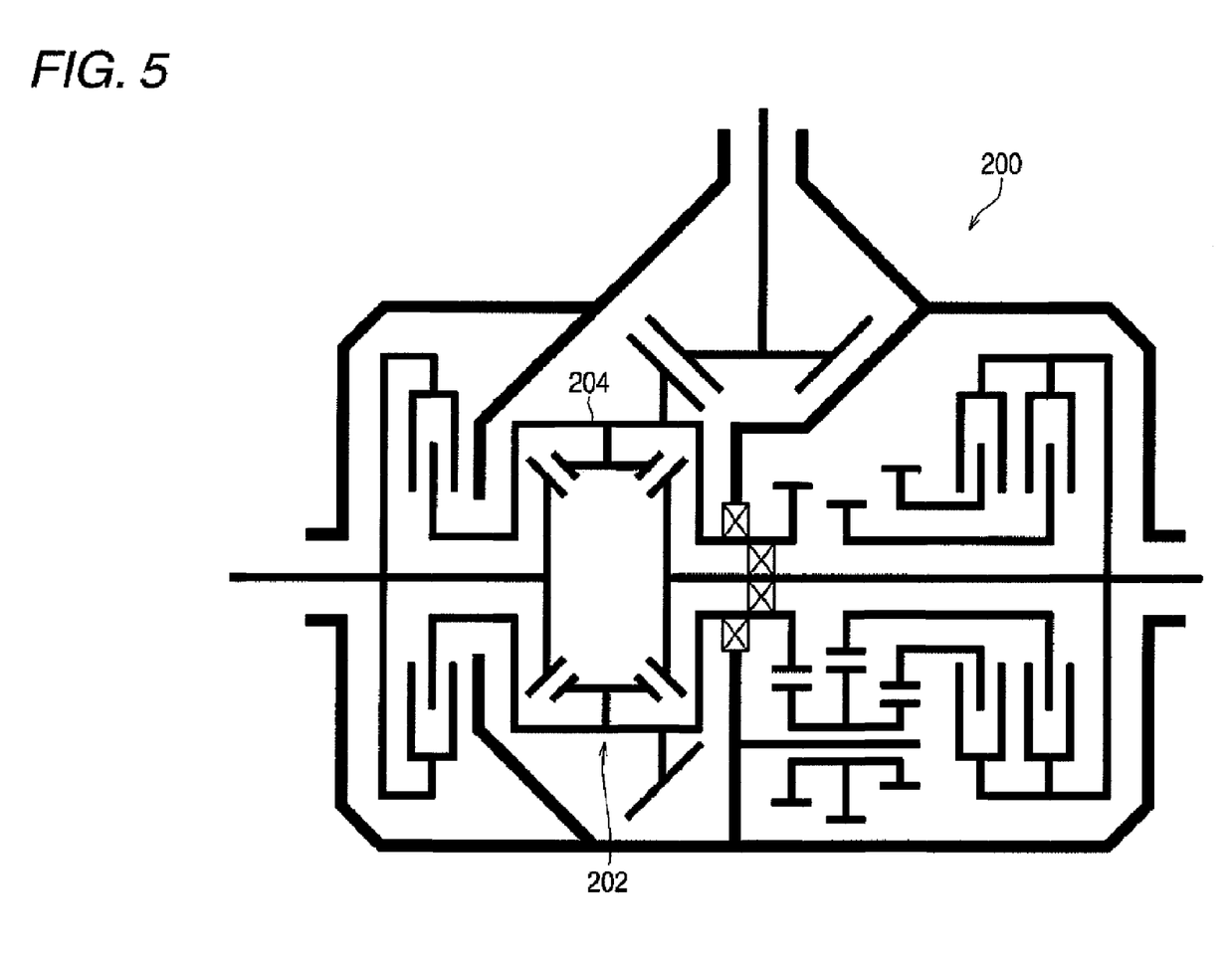
FIG. 5 is a constitution diagram schematically showing a driving-force laterally-distributing device according to a first modification.

Specifically, a driving-force laterally-distributing device 200, as shown in FIG. 5, according to a first modification is constituted to have a differential mechanism unit 202 equipped with a diff case 204 having the so-called bevel gear, in place of the diff case 54 which is disposed in the differential mechanism unit 34 of the aforementioned mode of embodiment and which has the planetary gear mechanism.

Figure 6:
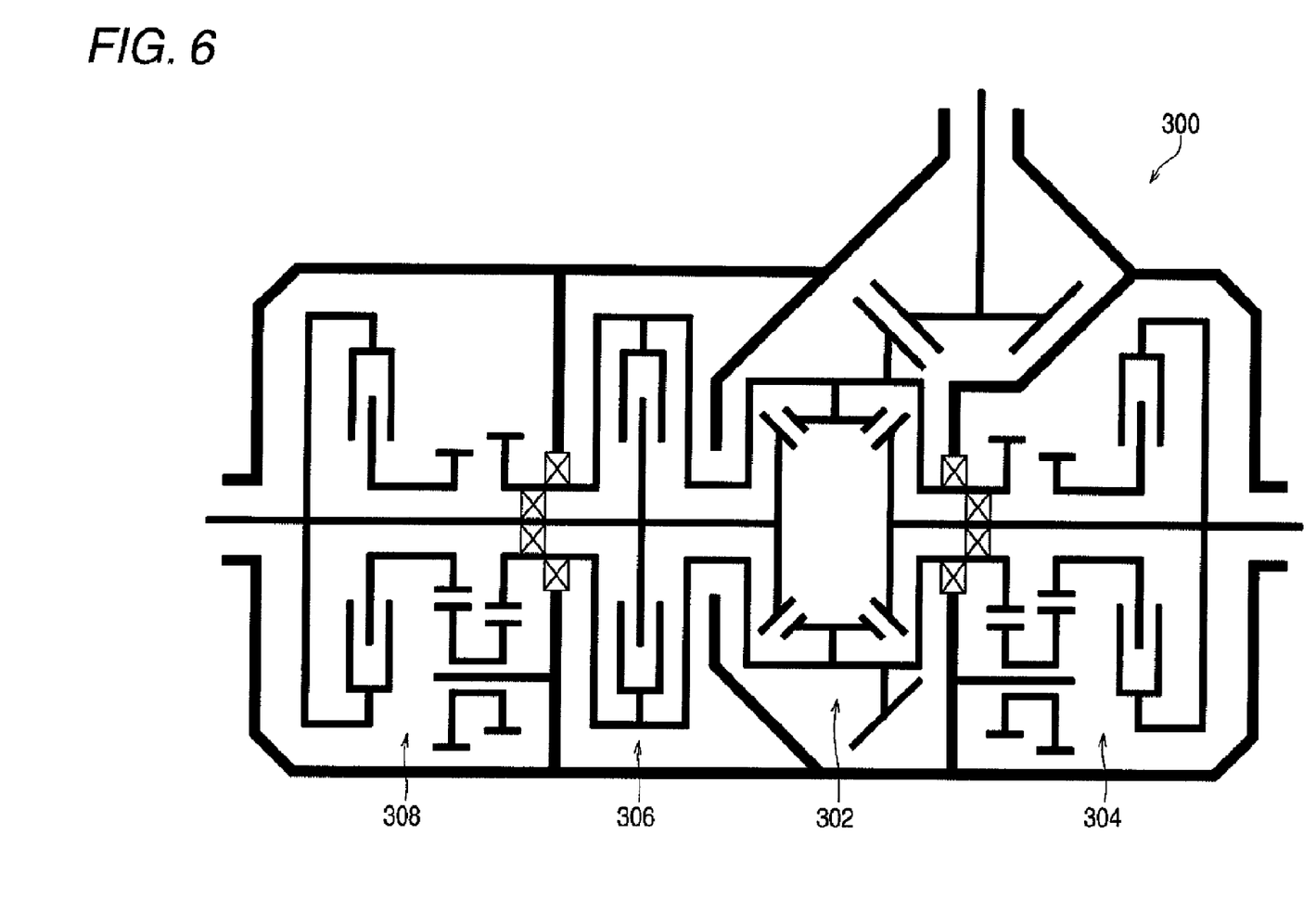
FIG. 6 is a constitution diagram schematically showing a driving-force laterally-distributing device according to a second modification.

A driving-force laterally-distributing device 300, as shown in FIG. 6, according to a second modification is constituted to divide the driving-force laterally-adjusting mechanism unit 36 of the aforementioned embodiment so laterally that a right driving-force adjusting unit 304 for distributing the driving force from the left rear wheel to the right rear wheel is arranged on the right side of a differential mechanism unit 302 and that a left driving-force adjusting unit 308 for distributing the driving force from the right rear wheel to the left rear wheel is arranged on the left side of a differential limiting unit 306.

Figure 7:
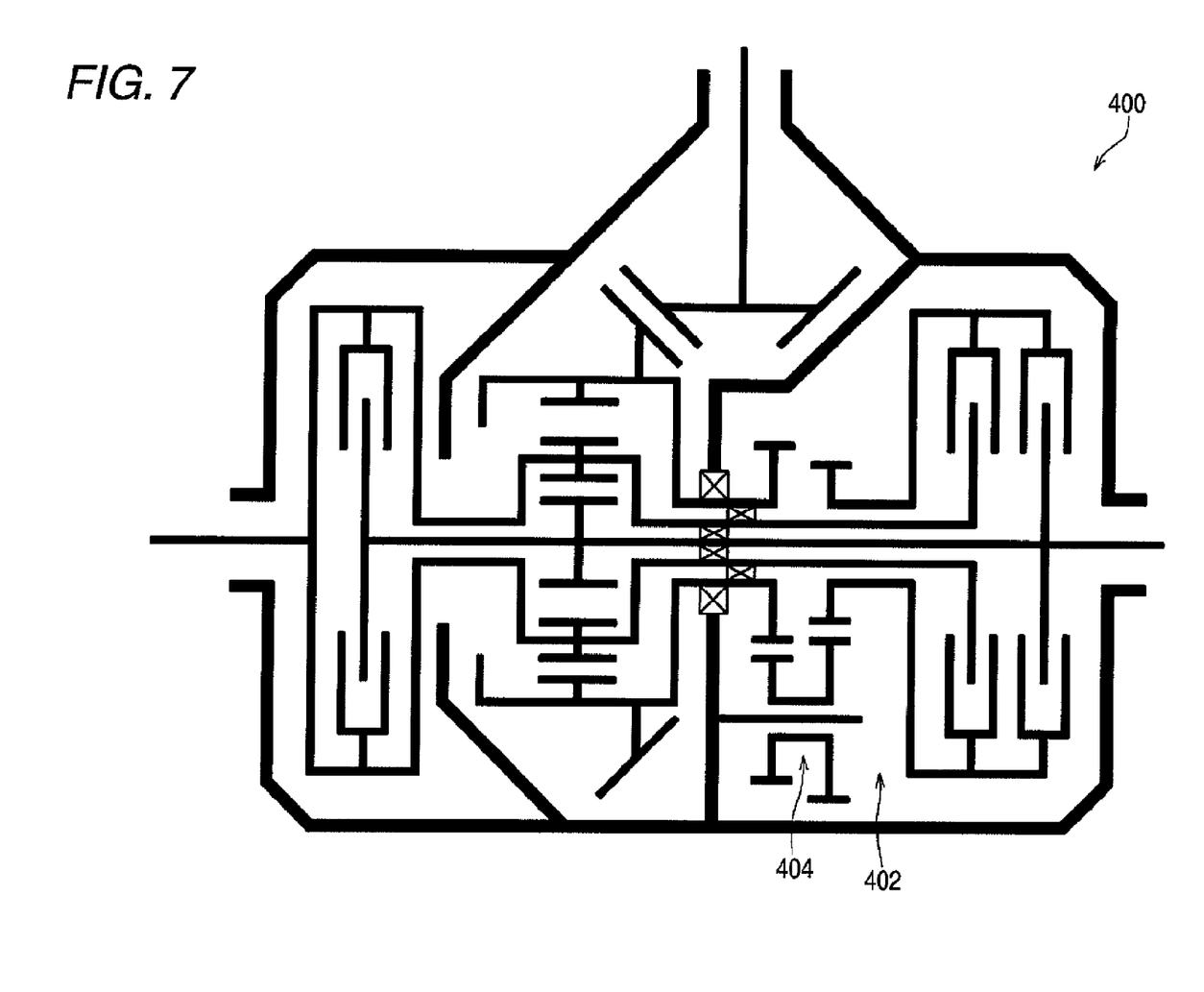
FIG. 7 is a constitution diagram schematically showing a driving-force laterally-distributing device according to a third modification.

A driving-force laterally-distributing device 400, as shown in FIG. 7, according to a third modification is constituted to have a driving-force laterally-adjusting mechanism unit 402 equipped with an accelerating gear 404 having two gear portions, in place of the accelerating/decelerating gear 68 which is disposed in the driving-force laterally-adjusting mechanism unit 36 of the aforementioned mode of embodiment and composed of the three gear portions.

Figure 8:
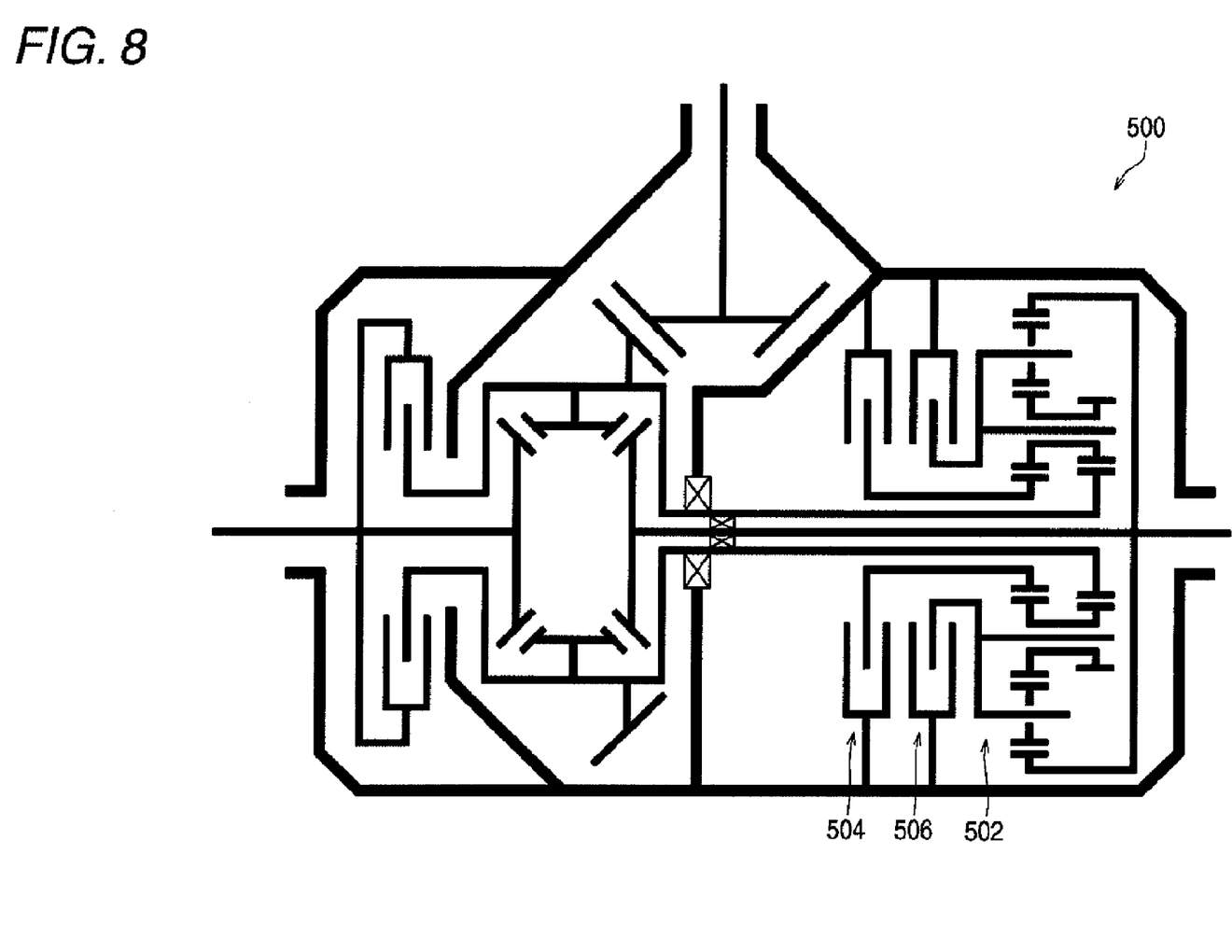
FIG. 8 is a constitution diagram schematically showing a driving-force laterally-distributing device according to a fourth modification.

A driving-force laterally-distributing device 500, as shown in FIG. 8, according to a fourth modification is constituted to have a driving-force laterally-adjusting mechanism unit 502 equipped with a brake 504 for shifting the driving force from the left axle to the right axle and a brake 506 for shifting the driving force from the right axle to the left axle, in place of the accelerating clutch portion 78 and the decelerating clutch portion 80, which are disposed in the driving-force laterally-adjusting mechanism unit 36 of the aforementioned mode of embodiment.

Figure 9:
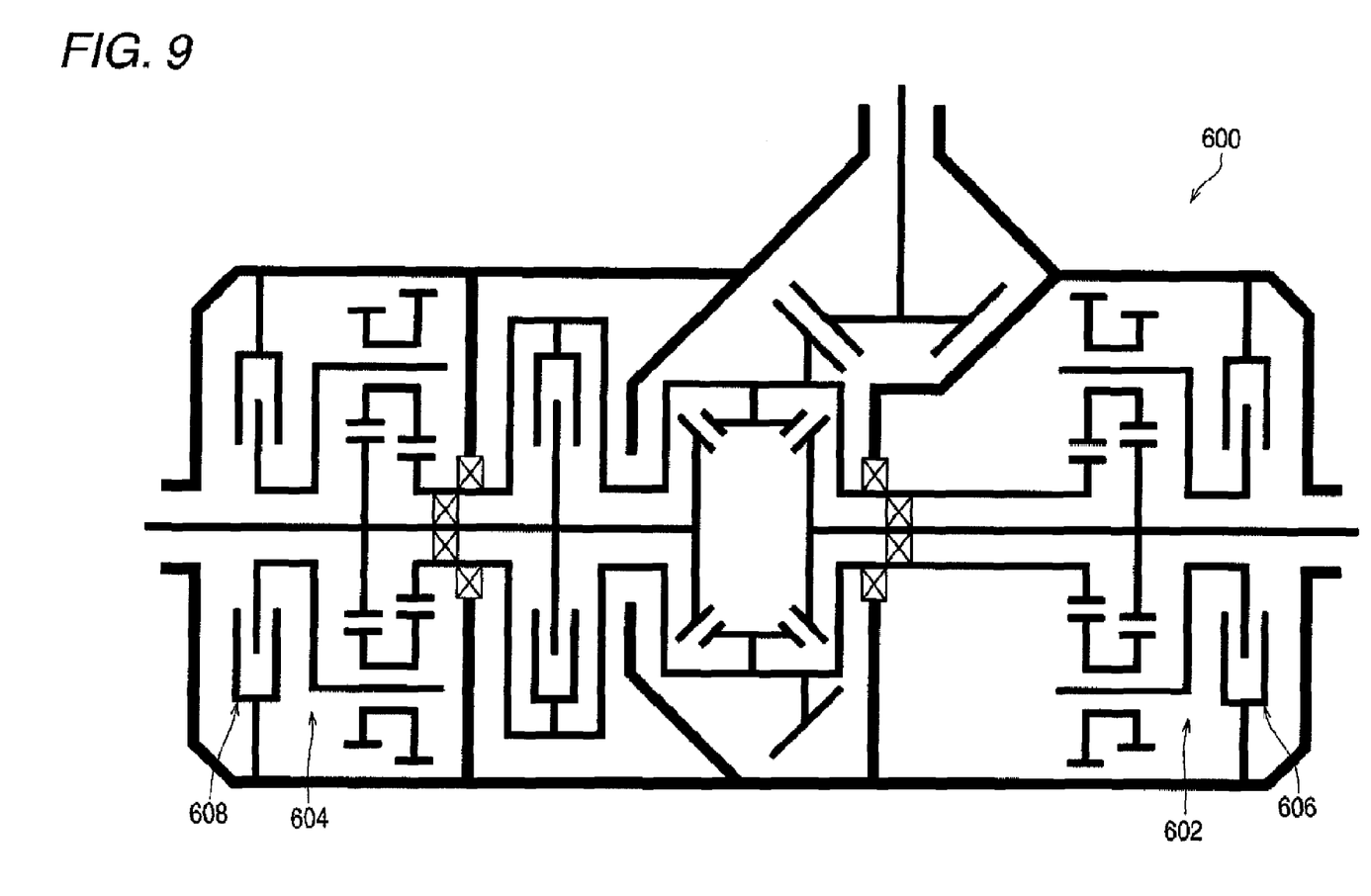
FIG. 9 is a constitution diagram schematically showing a driving-force laterally-distributing device according to a fifth modification.

A driving-force laterally-distributing device 600, as shown in FIG. 9, according to a fifth modification is constituted to divide the driving-force adjusting unit into a right driving force adjusting unit 602 and a left driving force adjusting unit 604, as in the aforementioned second modification, so that the individual driving force adjusting units are equipped with a brake 606 for shifting the driving force from the left axle to the right axle and a brake 608 for shifting the driving force from the right axle to the left axle, in place of the clutches of the aforementioned fourth modification.

Here, the functions of the differential mechanism unit, the driving force adjusting unit and the differential limiting mechanism unit in those individual modifications are substantially identical to those of the differential mechanism unit 34, the driving force adjusting unit 36 and the differential limiting mechanism unit 38.

In the aforementioned mode of embodiment, for example, the driving-force laterally-distributing device 28 is disposed on the rear-wheel side of the four-wheel drive vehicle. However, the invention should not be limited thereto but can be so modified in addition to those modifications that the device is disposed on the front-wheel side of the four-wheel drive or on the front-wheel drive car or the rear-wheel drive car.

In the aforementioned mode of embodiment, moreover, the vehicle 1 employs the engine 2 as the drive source, which should not be limited thereto but may be a motor or the like.

In the aforementioned mode of embodiment, moreover, the driving-force laterally-distributing device 28 is equipped with the driving-force laterally-adjusting mechanism unit 36 on the right side and the differential limiting mechanism unit 38 on the left side with respect to the differential mechanism unit 34. However, the constitution may also be modified by reversing the arrangement laterally.

What is claimed is:

1. A driving-force laterally-distributing device for distributing a driving force from a drive source of a vehicle to the left and right wheel axles depending on a driving state of the vehicle, the device comprising:

differential means for transmitting the driving force from the drive source to the left and right wheel axles while permitting a rotational difference between the left and right wheel axles of the vehicle;

driving-force laterally-adjusting means for adjusting the distribution of the driving force to the left and right wheel axles by controlling the transmission state of the driving force to be transmitted to the left and right wheel axles, the driving-force laterally-adjusting means being disposed coaxially with the axial line of the left and right wheel axles with respect to the differential means;

differential limiting means for limiting the rotational difference between the left and right wheel axles by applying a limiting torque to the differential means, the differential limiting means being disposed coaxially with the axial line of the left and right wheel axels with respect to the differential means; and a body case housing therein the differential means, the driving-force laterally-adjusting means, and the differential limiting means, wherein the body case includes a partition portion disposed between the differential means and the differential limiting means and a wall portion disposed between the differential means and the driving-force laterally-adjusting means, and wherein the wall portion watertight partitions one region for housing the differential means, the differential limiting means, and the partition portion and another region for housing the driving-force laterally-adjusting means so that different oils are retained in the one region and the other region.

2. The driving-force laterally-distributing device according to claim 1, wherein the partition portion includes a plurality of rib portions formed to extend in the axial direction or the radial direction of the left and right wheel axles from one side face of the partition portion.

3. The driving-force laterally-distributing device according to claim 2, wherein:

the differential limiting means includes a friction clutch portion for applying the limiting torque to the differential means by engagement, and wherein the friction clutch portion engages when pushed by push means from the other side to one side in the axial direction of the left and right wheel axles, and one side face of the friction clutch portion abuts against the other side face of the partition portion.

4. The driving-force laterally-distributing device according to claim 3, wherein:

the wall portion includes axle holes through which the left and right wheel axles-pass, and wherein a seal member for watertight sealing the one region and the other region is disposed in the axle holes.

5. The driving-force laterally-distributing device according to claim 4, wherein:

the wall portion is formed to expand toward the differential means from the driving-force laterally-adjusting means in the axial direction of the left and right wheel axles.

6. The driving-force laterally-distributing device according to claim 5, further comprising:

a transmission shaft for transmitting the driving force from the drive source of the vehicle to the differential means, wherein the wall portion is formed to expand toward the differential means from the driving-force laterally-adjusting means so as to cover the position of the transmission shaft in the axial direction of the left and right wheel axles.

* * * * *